(12) United States Patent
Han et al.

(10) Patent No.: US 12,451,560 B2
(45) Date of Patent: Oct. 21, 2025

(54) POLYOLEFIN SEPARATOR AND METHOD FOR MANUFACTURING THE SAME

(71) Applicant: LG Chem, Ltd., Seoul (KR)

(72) Inventors: Sung-Jae Han, Daejeon (KR); Joo-Sung Lee, Daejeon (KR); Won-Sik Bae, Daejeon (KR); Bi-Oh Ryu, Daejeon (KR)

(73) Assignee: LG Chem, Ltd., Seoul (KR)

( * ) Notice: Subject to any disclaimer, the term of this patent is extended or adjusted under 35 U.S.C. 154(b) by 823 days.

(21) Appl. No.: 17/441,367

(22) PCT Filed: Mar. 20, 2020

(86) PCT No.: PCT/KR2020/003910
§ 371 (c)(1),
(2) Date: Sep. 21, 2021

(87) PCT Pub. No.: WO2020/197198
PCT Pub. Date: Oct. 1, 2020

(65) Prior Publication Data
US 2022/0173479 A1   Jun. 2, 2022

(30) Foreign Application Priority Data
Mar. 22, 2019 (KR) .......... 10-2019-0033188

(51) Int. Cl.
*H01M 50/403* (2021.01)
*H01M 50/409* (2021.01)
(Continued)

(52) U.S. Cl.
CPC ....... *H01M 50/403* (2021.01); *H01M 50/409* (2021.01); *H01M 50/417* (2021.01);
(Continued)

(58) Field of Classification Search
CPC ............. H01M 50/403; H01M 50/417; H01M 50/491; H01M 50/409; H01M 50/449; H01M 50/489
See application file for complete search history.

(56) References Cited

U.S. PATENT DOCUMENTS 5,240,790 A    8/1993  Chua et al.
5,917,693 A *  6/1999  Kono ................. H01G 9/025
                                                  429/212
(Continued)

FOREIGN PATENT DOCUMENTS

CN   101989651 A   3/2011
CN   103081172 A   5/2013
(Continued)

OTHER PUBLICATIONS

International Search Report for PCT/KR2020/003910 mailed Jul. 22, 2020; 2 pages.
(Continued)

*Primary Examiner* — Brian R Ohara
*Assistant Examiner* — Emily Elizabeth Freeman
(74) *Attorney, Agent, or Firm* — Lerner David LLP

(57) ABSTRACT

A polyolefin separator is provided in the present disclosure. The polyolefin separator includes a polyolefin porous substrate including a plurality of fibrils and pores formed by the fibrils draped across one another. A coating layer surrounding the outer side of the fibrils is contained in the polyolefin porous substrate and the coating layer includes a crosslinked polymer, wherein the polyolefin separator having the coating layer has a change in air permeability of 20% or less and a change in basis weight of 4% or less, as compared to the polyolefin porous substrate. A method for manufacturing the polyolefin separator and a secondary battery including the polyolefin separator are also disclosed.

19 Claims, 1 Drawing Sheet

(51) Int. Cl.
H01M 50/417 (2021.01)
H01M 50/449 (2021.01)
H01M 50/489 (2021.01)
H01M 50/491 (2021.01)

(52) U.S. Cl.
CPC ....... H01M 50/449 (2021.01); H01M 50/491 (2021.01); H01M 50/489 (2021.01)

(56) References Cited

U.S. PATENT DOCUMENTS

| | | | |
|---|---|---|---|
| 2011/0027658 | A1 | 2/2011 | Kim et al. |
| 2013/0171501 | A1 | 7/2013 | Son et al. |
| 2015/0018442 | A1 | 1/2015 | Kim et al. |
| 2015/0037652 | A1* | 2/2015 | Kim .................. H01M 50/491 429/144 |
| 2015/0303428 | A1 | 10/2015 | Sawada et al. |
| 2016/0126518 | A1 | 5/2016 | Park et al. |
| 2016/0190537 | A1 | 6/2016 | Park et al. |
| 2016/0260976 | A1 | 9/2016 | Matsuo et al. |
| 2018/0294458 | A1 | 10/2018 | Ko et al. |
| 2021/0074983 | A1* | 3/2021 | Zhang ................. H01M 50/489 |

FOREIGN PATENT DOCUMENTS

| | | |
|---|---|---|
| CN | 103660513 A | 3/2014 |
| CN | 105576172 A | 5/2016 |
| CN | 105733154 A | 7/2016 |
| CN | 107022209 A | 8/2017 |
| JP | 2001017842 A | 1/2001 |
| JP | 2002138159 A | 5/2002 |
| JP | 2002-355938 A | 12/2002 |
| JP | 2013-536981 A | 9/2013 |
| JP | 2015-063639 A | 4/2015 |
| JP | 2015-221889 A | 12/2015 |
| JP | 2016124926 A | 7/2016 |
| KR | 101125013 B1 | 3/2012 |
| KR | 2013-0092245 A | 8/2013 |
| KR | 20130093836 A | 8/2013 |
| KR | 20160025897 A | 3/2016 |
| KR | 101637477 B1 | 7/2016 |
| KR | 20160077064 A | 7/2016 |
| KR | 20160128725 A | 11/2016 |
| KR | 101694473 B1 | 1/2017 |
| WO | 2014/073451 A1 | 5/2014 |

OTHER PUBLICATIONS

Extended European Search Report including Written Opinion for Application No. 20777187.4 dated Apr. 4, 2022, pp. 1-9.
Kim, J.Y. et al., "Surface-Modified Membrane as A Separator for Lithium-Ion Polymer Battery," Energies, Apr. 23, 2010, pp. 866-885, vol. 3, No. 4, Basel, Switzerland. XP055355967.
Search Report dated Nov. 21, 2022 from Office Action for Chinese Application Application No. 202080022520 issued Nov. 25, 2022. 3 pgs.

* cited by examiner

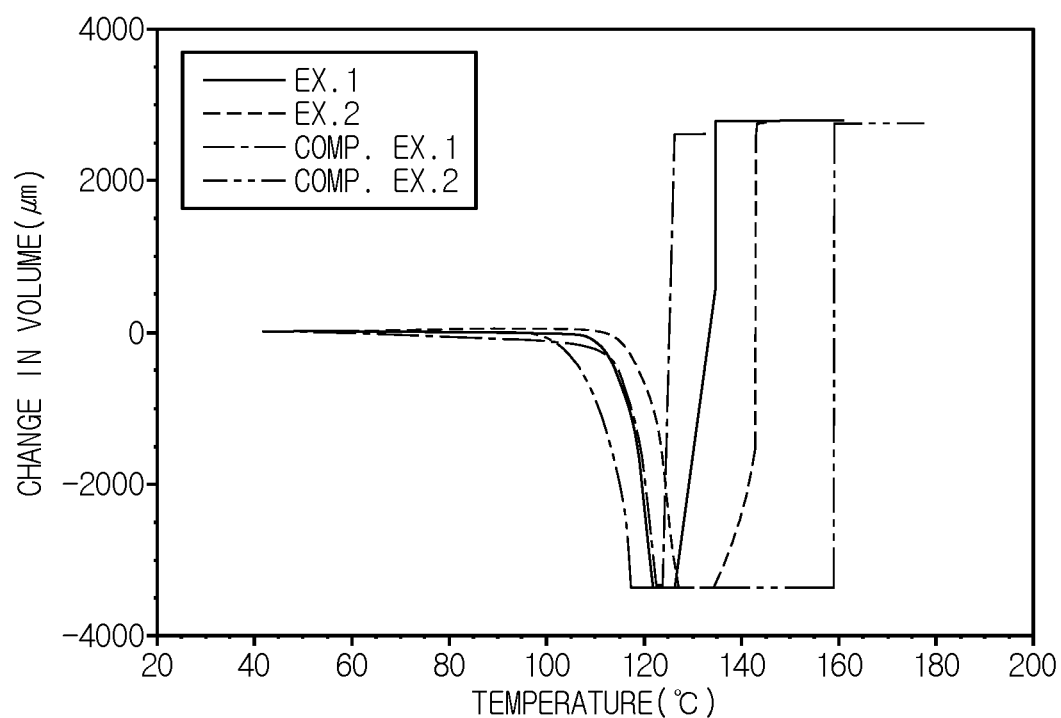

POLYOLEFIN SEPARATOR AND METHOD FOR MANUFACTURING THE SAME

CROSS-REFERENCE TO RELATED APPLICATIONS

The present application is a national stage entry under 35 U.S.C. § 371 of International Application No. PCT/KR2020/003910 filed on Mar. 20, 2020, which claims priority to Korean Patent Application No. 10-2019-0033188 filed on Mar. 22, 2019 in the Republic of Korea, the disclosures of which are incorporated herein by reference.

TECHNICAL FIELD

The present disclosure relates to a polyolefin separator and a method for manufacturing the same.

BACKGROUND ART

Recently, energy storage technology has been given an increasing attention. Efforts into research and development for electrochemical devices have been actualized more and more, as the application of energy storage technology has been extended to energy for cellular phones, camcorders and notebook PC and even to energy for electric vehicles. In this context, electrochemical devices have been most spotlighted. Among such electrochemical devices, development of rechargeable secondary batteries has been focused.

Among the commercially available secondary batteries, lithium secondary batteries developed in the early 1990's have been spotlighted, since they have a higher operating voltage and significantly higher energy density as compared to conventional batteries, such as Ni-MH, Ni—Cd and sulfuric acid-lead batteries using an aqueous electrolyte.

Such a lithium secondary battery includes a positive electrode, a negative electrode, an electrolyte and a separator. Particularly, it is required for the separator to have insulation property for separating the positive electrode and the negative electrode from each other and high ion conductivity for increasing lithium ion permeability based on high porosity.

Such a separator may be obtained by kneading polyolefin with a diluting agent, carrying out extrusion and elongation to form a film, and extracting the diluting agent by using a solvent, or the like, thereby forming pores.

Meanwhile, in order to apply a lithium secondary battery to electric vehicles (EV), innovative improvement of safety and cost is required.

In the case of a polyethylene (PE) separator as a typical polyolefin separator, it has a low melting point ($T_m$), and thus may cause ignition and explosion due to a melt-down phenomenon, when battery temperature increases above the melting point of polyethylene under battery misuse environment. To reinforce the safety of a separator, there has been an attempt to use a PE/PP/PE tri-layer separator by mixing polypropylene (PP) having a relatively higher melting point as compared to polyethylene, instead of a polyethylene monolayer separator. Such a PE/PP/PE tri-layer separator is advantageous in that it can increase the melt-down temperature as compared to a polyethylene monolayer separator, but it shows a limitation in that it requires a more complicated manufacturing process, as compared to a monolayer wet polyethylene separator.

DISCLOSURE

Technical Problem

The present disclosure is designed to solve the problems of the related art, and therefore the present disclosure is directed to providing a polyolefin separator having improved high-temperature stability and a method for manufacturing the same.

Technical Solution

In one aspect of the present disclosure, there is provided a polyolefin separator according to any one of the following embodiments.

According to the first embodiment of the present disclosure, there is provided a polyolefin separator, including:
  a polyolefin porous substrate including a plurality of fibrils and pores formed by the plurality of fibrils draped across one another; and
  a coating layer surrounding the outer side of the fibrils contained in the polyolefin porous substrate and including a crosslinked polymer,
  wherein the polyolefin separator having the coating layers shows a change in air permeability of 20% or less and a change in basis weight of 4% or less, as compared to the polyolefin porous substrate.

According to the second embodiment of the present disclosure, there is provided the polyolefin separator as defined in the first embodiment, wherein the crosslinked polymer is a product obtained through UV curing of a crosslinking agent and photoinitiator.

According to the third embodiment of the present disclosure, there is provided the polyolefin separator as defined in the first or the second embodiment, wherein the polyolefin separator having the coating layers shows a change in air permeability of 3-20% and a change in basis weight of 0.5-4%, as compared to the polyolefin porous substrate.

In another aspect of the present disclosure, there is provided a method for manufacturing a polyolefin separator as defined in any one of the following embodiments.

According to the fourth embodiment of the present disclosure, there is provided a method for manufacturing a polyolefin separator, including the steps of:
  preparing a photocurable composition containing a crosslinking agent, a photoinitiator and a solvent;
  dipping a polyolefin porous substrate including a plurality of fibrils in the photocurable composition and carrying out drying at room temperature so that the photocurable composition is coated on the surfaces of the plurality of fibrils of the polyolefin porous substrate; and
  carrying out UV curing of one or both surfaces of the porous substrate coated with the photocurable composition to form coating layers,
  wherein the polyolefin separator having the coating layers shows a change in air permeability of 20% or less and a change in basis weight of 4% or less, as compared to the polyolefin porous substrate.

According to the fifth embodiment of the present disclosure, there is provided a method for manufacturing a polyolefin separator, including the steps of:
  introducing polyolefin and a diluting agent to an extruder and mixing them therein, and carrying out extrusion to prepare a polyolefin composition;
  allowing the extruded polyolefin composition to pass through a die and cold casting roll to mold it in the form of a sheet;

elongating the molded sheet;

extracting the diluting agent from the elongated sheet;

dipping the sheet from which the diluting agent is extracted in a photocurable composition containing a crosslinking agent, a photocuring initiator and a solvent, and carrying out drying at room temperature so that the photocurable composition is coated on the surfaces of the fibrils of the elongated sheet; and thermally fixing the sheet coated with the photocurable composition, the method further including a step of carrying out UV curing of one or both surfaces of the coated sheet, before or after the thermal fixing step, thereby forming coating layers, wherein the polyolefin separator having the coating layers shows a change in air permeability of 20% or less and a change in basis weight of 4% or less, as compared to the polyolefin porous substrate.

According to the sixth embodiment of the present disclosure, there is provided the method for manufacturing a polyolefin separator as defined in the fourth or the fifth embodiment, wherein the crosslinking agent is a multifunctional (meth)acrylate monomer.

According to the seventh embodiment of the present disclosure, there is provided the method for manufacturing a polyolefin separator as defined in any one of the fourth to the sixth embodiments, wherein the crosslinking agent is a (meth)acrylate monomer having 2 to 5 carbon-carbon double bonded groups.

According to the eighth embodiment of the present disclosure, there is provided the method for manufacturing a polyolefin separator as defined in any one of the fourth to the sixth embodiments, wherein the crosslinking agent includes triethylene glycol di(meth)acrylate, tetraethylene glycol di(meth)acrylate, polyethylene glycol di(meth)acrylate, tripropylene glycol di(meth)acrylate, tetrapropylene glycol di(meth)acrylate, polypropylene glycol di(meth)acrylate, polytetramethylene glycol di(meth)acrylate, dioxane glycol di(meth)acrylate, bis(meth)acryloyloxyethyl phosphate, trimethylolpropane tri(meth)acrylate, trimethylolpropane EO-added tri(meth)acrylate, trimethylolpropane PO-added tri(meth)acrylate, pentaerythritol tri(meth)acrylate, 2,2,2-tris(meth)acryloyloxy methylethylsuccinic acid, ethoxylated isocyanuric acid tri(meth)acrylate, tris-(2-(meth)acryloxyethyl) isocyanurate, glycerin EO-added tri(meth)acrylate, glycerin PO-added tri(meth)acrylate, tris (meth)acryloyloxyethyl phosphate, trimethylolpropane tri(meth)acrylate, trimethylolpropane EO-added tri(meth)acrylate, pentaerythritol tri(meth)acrylate, ditrimethylolpropane tetra(meth)acrylate, pentaerythritol tetra(meth)acrylate, pentaerythritol EO-added tetra(meth)acrylate, dipentaerythritol penta(meth)acrylate, or two or more of them.

According to the ninth embodiment of the present disclosure, there is provided the method for manufacturing a polyolefin separator as defined in any one of the fourth to the eighth embodiments, wherein the photoinitiator includes benzoin methyl ether, 2,4,6-trimethylbenzoyl diphenyl phosphine oxide (TPO), bis(2,4,6-trimethylbenzoyl)phenyl phosphine oxide, α,α-methoxy-α-hydroxyacetophenone, 2-benzoyl-2-(dimethylamino)-1-[4-(4-morpholinyl)phenyl]-1-butanone, 2,2-dimethoxy-2-phenylacetophenone, 2,2-dimethoxy-1,2-diphenylethane-1-on, 1-hydroxy-cyclohexyl-phenylketone, 2-benzyl-2-(dimethylamino)-1-[4-(4-morpholinyl)phenyl]-1-butanone, or two or more of them.

According to the tenth embodiment of the present disclosure, there is provided the method for manufacturing a polyolefin separator as defined in any one of the fourth to the ninth embodiments, wherein the weight ratio of the crosslinking agent to the photoinitiator is 1:1-10:1.

According to the eleventh embodiment of the present disclosure, there is provided the method for manufacturing a polyolefin separator as defined in any one of the fourth to the tenth embodiments, wherein each of the content of the crosslinking agent and that of the photoinitiator is independently 0.1-20 wt %, based on 100 wt % of the photocurable composition.

In another aspect of the present disclosure, there is provided a secondary battery as defined in the following embodiment.

According to the twelfth embodiment of the present disclosure, there is provided a secondary battery including a positive electrode, a negative electrode and a separator interposed between the positive electrode and the negative electrode, wherein the separator is the same as defined in any one of the first to the third embodiments.

Advantageous Effects

The polyolefin separator according to an embodiment of the present disclosure is provided with coating layers surrounding the outside of the fibrils contained in a polyolefin porous substrate and including a crosslinked polymer. Thus, as compared to the conventional PE/PP/PE tri-layer separator, the polyolefin separator requires a simple manufacturing process, and has a significantly improved melt-down temperature while maintaining physical properties of air permeability and porosity substantially the same as those of the polyolefin porous substrate before coating, as compared to a separator having a coating layer formed separately on at least one surface of a polyolefin porous substrate. Therefore, it is possible to provide a separator having significantly improved stability.

As a result, the polyolefin separator according to an embodiment of the present disclosure overcomes the disadvantage of a polyolefin having a low melting point, and thus can significantly prevent a risk of ignition and explosion by virtue of its high melt-down temperature, even when it is applied to electric vehicles.

In addition, when the surface energy of the polyolefin separator is changed depending on material used for coating the fibrils, it is possible to improve the electrolyte wettability of the separator, thereby providing improved battery assemblage processability.

Further, the separator according to an embodiment of the present disclosure uses a photocurable composition for coating the polyolefin porous substrate. Thus, it is possible to apply the photocurable composition in such a manner that the photocurable composition may uniformly surround not only the fibrils of the polyolefin porous substrate surface but also the outside of the fibrils in the polyolefin porous substrate.

As compared to the other conventional coating processes, such as chemical vapor deposition, it is possible to form coating layers surrounding the outside of the fibrils not only on the polyolefin separator surface but also inside the polyolefin separator, according to an embodiment of the present disclosure. Therefore, the polyolefin separator is provided with uniform coating layers in the thickness direction thereof, and thus has improved physical properties of air permeability and porosity and shows significantly improved thermal stability, as compared to the related art in which a coating layer is formed only on the surface of a separator.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

The FIGURE is a graph illustrating a change in volume (length) as a function of temperature in each of the polyolefin separators obtained from Examples 1 and 2 and Comparative Examples 1 and 2.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

In one aspect of the present disclosure, there is provided a polyolefin separator, including:

- a polyolefin porous substrate including a plurality of fibrils and pores formed by the plurality of fibrils draped across one another; and
- a coating layer surrounding the outer side of the fibrils contained in the polyolefin porous substrate and including a crosslinked polymer,
- wherein the polyolefin separator having the coating layers shows a change in air permeability of 20% or less and a change in basis weight of 4% or less, as compared to the polyolefin porous substrate.

Herein, the term 'fibrils' means those formed by longitudinal elongation and orientation of polymer chains forming the polyolefin porous substrate during preparation of a porous substrate, so that the binding force between the adjacent molecular chains may be increased to cause aggregation in the longitudinal direction. As a result, the porous polymer substrate has a structure in which a plurality of fibrils aligned in parallel with the surface of the substrate are stacked in layers.

The polyolefin porous substrate that may be used includes a polyolefin porous film, polyolefin porous non-woven web, or the like.

According to an embodiment of the present disclosure, the polyolefin may be polyethylene; polypropylene; polybutylene; polypentene; polyhexene; polyoctene; a copolymer of at least two of ethylene, propylene, butene, pentene, 4-methylpentene, hexene, heptene and octene; or a mixture thereof.

Particularly, polyethylene includes low-density polyethylene (LDPE), linear low-density polyethylene (LLDPE), high-density polyethylene (HDPE), or the like. Among those, high-density polyethylene having a high crystallization degree and a high resin melting point is most preferred.

According to an embodiment of the present disclosure, the polyolefin may have a weight average molecular weight of 200,000-1,500,000, 220,000-1,000,000, or 250,000-800,000. According to the present disclosure, it is possible to obtain a separator having excellent strength and heat resistance while ensuring uniformity and film forming processability of the separator by using high-molecular weight polyolefin having a weight average molecular weight of 200,000-1,000,000 as a starting material for manufacturing the separator. Herein, the weight average molecular weight of the polyolefin may be determined by using gel permeation chromatography (GPC).

The polyolefin separator according to the present disclosure is provided with coating layers bound to the polyolefin porous substrate, wherein the coating layers are different from a separate coating layer forming an interface facing the porous substrate on one surface or both surfaces of the polyolefin porous substrate according to the related art.

The polyolefin porous substrate having such a separate coating layer according to the related art is problematic in that formation of the coating layer may cause blocking of the pores of the polyolefin porous substrate before coating, and thus air permeability and basis weight may be reduced significantly, as compared to the polyolefin porous substrate before coating.

However, the coating layers provided in the polyolefin separator according to the present disclosure surround the outside of the fibrils contained in the polyolefin porous substrate, and thus are not separate coating layers differentiated from the porous substrate but are layers formed on the surface of each of the fibrils. As a result, the polyolefin separator having the coating layers according to the present disclosure can retain the porous structure of the polyolefin porous substrate before coating as it is, and thus air permeability and basis weight are not increased significantly as compared to the polyolefin porous substrate before coating, and a change in air permeability and a change basis weight are small.

As compared to the polyolefin porous substrate, the polyolefin separator having the coating layers shows a change in air permeability of 20% or less and a change in basis weight of 4% or less.

Particularly, as compared to the polyolefin porous substrate, the polyolefin separator having the coating layers shows a change in air permeability of 3-20%, or 6.94-20%, or 6.94-8.33%, and a change in basis weight of 0.5-4%, or 0.5-2.2%.

When the change in air permeability and change in basis weight of the polyolefin separator having the coating layers as compared to the polyolefin porous substrate satisfy the above-defined ranges, it is possible to provide a polyolefin separator having improved physical properties, such as thermal stability, while not causing any change in quality of the polyolefin porous substrate.

Herein, the change in air permeability and change in basis weight may be calculated according to the following formulae:

$$\text{Change in air permeability (\%)} =$$
$$[(\text{Air permeability of polyolefin porous substrate having coating layers}) - (\text{Air permeability of polyolefin porous substrate before coating})] / (\text{Air permeability of polyolefin porous substrate before coating}) \times 100$$

$$\text{Change in basis weight (\%)} =$$
$$[(\text{Basis weight of polyolefin porous substrate having coating layers}) - (\text{Basis weight of polyolefin porous substrate before coating})] / (\text{Basis weight of polyolefin porous substrate before coating}) \times 100$$

Herein, air permeability (Gurley) may be determined according to the method defined by ASTM D726-94. As used herein, Gurley means resistance against air flow and is determined by Gurley densometer. The air permeability value means the time (second), i.e. air permeation time, required for 100 cc of air to pass through the section of 1 in$^2$ of a polyolefin separator under a pressure of 12.2 in H$_2$O.

In addition, basis weight (g/m$^2$) may be determined by preparing a polyolefin separator sample having a width and length of 1 m×1 m and measuring the weight thereof.

The coating layers include a crosslinked polymer and the crosslinked polymer may be a product obtained from UV curing of a crosslinking agent and a photoinitiator.

In another aspect of the present disclosure, there is provided a method for manufacturing a polyolefin separator, including the steps of:

preparing a photocurable composition containing a crosslinking agent, a photoinitiator and a solvent;

dipping a polyolefin porous substrate including a plurality of fibrils in the photocurable composition and carrying out drying at room temperature so that the photocurable composition is coated on the surfaces of the plurality of fibrils of the polyolefin porous substrate; and carrying out UV curing of one or both surfaces of the porous substrate coated with the photocurable composition to form coating layers, wherein the polyolefin separator having the coating layers shows a change in air permeability of 20% or less and a change in basis weight of 4% or less, as compared to the polyolefin porous substrate.

The crosslinking agent may include a multifunctional (meth)acrylate monomer. Particularly, the crosslinking agent may include a (meth)acrylate monomer having 2 to 5 carbon-carbon double bonded groups, but is not limited thereto.

Particular examples of the (meth)acrylate monomer having two carbon-carbon double bonded groups, i.e. difunctional (meth)acrylate monomer include triethylene glycol di(meth)acrylate, tetraethylene glycol di(meth)acrylate, polyethylene glycol di(meth)acrylate, tripropylene glycol di(meth)acrylate, tetrapropylene glycol di(meth)acrylate, polypropylene glycol di(meth)acrylate, polytetramethylene glycol di(meth)acrylate, dioxane glycol di(meth)acrylate, bis(meth)acryloyloxyethyl phosphate, or the like.

Particular examples of the (meth)acrylate monomer having three carbon-carbon double bonded groups, i.e. trifunctional (meth)acrylate monomer include trimethylolpropane tri(meth)acrylate, trimethylolpropane EO-added tri(meth)acrylate, trimethylolpropane PO-added tri(meth)acrylate, pentaerythritol tri(meth)acrylate, 2,2,2-tris(meth)acryloyloxy methylethylsuccinic acid, ethoxylated isocyanuric acid tri(meth)acrylate, tris-(2-(meth)acryloxyethyl) isocyanurate, glycerin EO-added tri(meth)acrylate, glycerin PO-added tri(meth)acrylate, tris (meth)acryloyloxyethyl phosphate, or the like. Among them, trimethylolpropane tri(meth)acrylate, trimethylolpropane EO-added tri(meth)acrylate and pentaerythritol tri(meth)acrylate are preferred.

Particular examples of the (meth)acrylate monomer having four carbon-carbon double bonded groups, i.e. tetrafunctional (meth)acrylate monomer include ditrimethylolpropane tetra(meth)acrylate, pentaerythritol tetra(meth)acrylate, pentaerythritol EO-added tetra(meth)acrylate, or the like.

Particular examples of the (meth)acrylate monomer having five carbon-carbon double bonded groups, i.e. pentafunctional (meth)acrylate monomer include dipentaerythritol penta(meth)acrylate.

Such multifunctional (meth)acrylate monomers may be used alone or in combination.

According to an embodiment of the present disclosure, in addition to the multifunctional (meth)acrylate monomer, at least one monofunctional monomer, such as monofunctional (meth)acrylate may be further used. Particular examples of the monofunctional (meth)acrylate include alkyl (meth)acrylates, such as methyl (meth)acrylate, ethyl (meth)acrylate, propyl (meth)acrylate, isopropyl (meth)acrylate, n-butyl (meth)acrylate, isobutyl (meth)acrylate, n-amyl (meth)acrylate, isoamyl (meth)acrylate, n-hexyl (meth)acrylate, 2-ethylhexyl (meth)acrylate, and dodecyl (meth)acrylate.

The photoinitiator is not particularly limited, as long as it can be applied to photopolymerization. Non-limiting examples of the photoinitiator include benzoin methyl ether, 2,4,6-trimethylbenzoyl diphenyl phosphine oxide (TPO), bis(2,4,6-trimethylbenzoyl)phenyl phosphine oxide, α,α-methoxyl-α-hydroxyacetophenone, 2-benzoyl-2-(dimethylamino)-1-[4-(4-morpholinyl)phenyl]-1-butanone, 2,2-dimethoxy-2-phenylacetophenone, 2,2-dimethoxy-1,2-diphenylethane-1-on, 1-hydroxy-cyclohexyl-phenylketone, 2-benzyl-2-(dimethylamino)-1-[4-(4-morpholinyl)phenyl]-1-butanone, or two or more of them.

The weight ratio of the crosslinking agent to the photoinitiator may be 1:1-10:1, or 1:1-3:1. When the weight ratio of the crosslinking agent to the photoinitiator satisfies the above-defined range, it is possible to inhibit side reactions, while allowing rapid reaction even with a small UV dose.

In addition, each of the content of the crosslinking agent and that of the photoinitiator may be independently 0.1-20 wt %, 0.2-15 wt %, 0.3-10 wt %, 0.3-1 wt %, or 0.3-0.6 wt %, based on 100 wt % of the photocurable composition. When the content of the crosslinking agent and that of the photoinitiator satisfy the above-defined ranges, it is possible to increase the melt-down temperature of the separator sufficiently, while maintaining the permeation property of the separator.

In still another aspect of the present disclosure, there is provided a method for manufacturing a polyolefin separator, including the steps of:

introducing polyolefin and a diluting agent to an extruder and mixing them therein, and carrying out extrusion to prepare a polyolefin composition;

allowing the extruded polyolefin composition to pass through a die and cold casting roll to mold it in the form of a sheet;

elongating the molded sheet;

extracting the diluting agent from the elongated sheet;

dipping the sheet from which the diluting agent is extracted in a photocurable composition containing a crosslinking agent, a photocuring initiator and a solvent, and carrying out drying at room temperature so that the photocurable composition is coated on the surfaces of the fibrils of the elongated sheet; and thermally fixing the sheet coated with the photocurable composition, the method further including a step of carrying out UV curing of one or both surfaces of the coated sheet, before or after the thermal fixing step, thereby forming coating layers.

wherein the polyolefin separator having the coating layers shows a change in air permeability of 20% or less and a change in basis weight of 4% or less, as compared to the polyolefin porous substrate.

The method will be explained in more detail hereinafter.

First, polyolefin and a diluting agent are introduced to an extruder and mixed therein to prepare a polyolefin composition.

According to an embodiment of the present disclosure, the polyolefin may be polyethylene; polypropylene; polybutylene; polypentene; polyhexene; polyoctene; a copolymer of at least two of ethylene, propylene, butene, pentene, 4-methylpentene, hexene and octene; or a mixture thereof.

According to an embodiment of the present disclosure, the diluting agent may include liquid or solid paraffin oil, mineral oil, wax, soybean oil, or the like, used currently for manufacturing a separator through a wet process.

According to an embodiment of the present disclosure, the diluting agent may be one capable of liquid-liquid phase separation against polyolefin. For example, the diluting agent may be a phthalic acid ester, such as dibutyl phthalate, dihexyl phthalate, dioctyl phthalate, or the like; aromatic ether, such as diphenyl ether, benzyl ether, or the like; C10-C20 fatty acid, such as palmitic acid, stearic acid, oleic acid, linolic acid, linolenic acid, or the like, C10-C20 fatty acid alcohol, such as palmitic acid alcohol, stearic acid alcohol, oleic acid alcohol, or the like; and a fatty acid ester such as palmitic acid mono-, di- or tri-ester, stearic acid mono-, di- or tri-ester, oleic acid mono-, di- or tri-ester, linoleic acid mono-, di- or tri-ester, or the like, resulting from an esterification between saturated or unsaturated fatty acid whose fatty acid group has 4-26 carbon atoms or one or at least two fatty acids having an epoxy-substituted double bond of unsaturated fatty acid, and C1-C10 alcohol having 1-8 hydroxyl groups.

The diluting agent may include any one of the above-described ingredients or a mixture of at least two of them.

According to an embodiment of the present disclosure, the content of the diluting agent may be 100-350 parts by weight, 125-300 parts by weight, or 150-250 parts by weight, based on 100 parts by weight of the total weight of the polyolefin. When the total content of the diluting agent satisfies the above-defined range, it is possible to reduce the problems caused by an increase in polyolefin content, such as a decrease in porosity and pore size, reduced interconnection among pores and a significant decrease in permeability, an increase in viscosity of a polyolefin composition and extrusion load, and a difficulty in processing. It is also possible to reduce the problems caused by a decrease in polyolefin content, such as fracture upon elongation and non-uniform thickness, caused by a decrease in compatibility of polyolefin with a diluting agent and extrusion of polyolefin in the form of gel without thermodynamic blending of polyolefin with a diluting agent.

According to an embodiment of the present disclosure, if necessary, the polyolefin composition may further include conventional additives for improving specific functions, such as a surfactant, an antioxidant, UV stabilizer, antistatic agent, nucleating agent, or the like.

According to an embodiment of the present disclosure, the extrusion step may be carried out by using a uniaxial extruder or biaxial extruder.

According to an embodiment of the present disclosure, the extruder may be a biaxial extruder including a hopper, a kneading section configured to convey and mix the introduced material, and a die outlet configured to extrude the mixed materials.

Next, the extruded polyolefin composition is molded in the form of a sheet and elongated.

For example, the extruded polyolefin composition is extruded by using an extruder equipped with a T-die, or the like, and then cooled extrudate may be formed by using a general casting or calendering process using water-cooling or air-cooling mode.

According to an embodiment of the present disclosure, it is possible to provide a separator having improved mechanical strength and puncture strength through the elongation step as mentioned above.

According to an embodiment of the present disclosure, the elongation may be carried out by sequential or simultaneous elongation using a roll or tenter. The elongation ratio may be 3 times or more, or 4-10 times, each in the machine direction and transverse direction, and the total elongation ratio may be 14-100 times. When the elongation ratio satisfies the above-defined ratio, it is possible to prevent the problem of insufficient orientation in one direction, a failure in balance of physical properties between the machine direction and the transverse direction, and degradation of tensile strength and puncture strength. When the total elongation ratio satisfies the above-defined range, it is possible to prevent the problems of non-elongation or a failure in pore formation.

According to an embodiment of the present disclosure, the elongation temperature may be varied with the melting point of polyolefin and concentration and type of the diluting agent.

According to an embodiment of the present disclosure, when the polyolefin is polyethylene, the diluting agent is liquid paraffin and the liquid paraffin has a dynamic viscosity of 50-150 cSt at 40° C., the elongation temperature may be 70-160° C., 90-140° C., or 100-130° C. in the machine direction (MD), and may be 90-180° C., 110-160° C., or 120-150° C. in the transverse direction (TD). When carrying out elongation in both directions at the same time, the elongation temperature may be 90-180° C., 110-160° C., or 110-150° C.

When the elongation temperature satisfies the above-defined range, it is possible to prevent the problem of fracture or non-elongation caused by the lack of softness resulting from a low elongation temperature. In addition, it is possible to prevent over-elongation or a difference in physical properties, caused by a high elongation temperature.

Then, the diluting agent is extracted from the molded and elongated sheet to obtain a porous membrane.

According to an embodiment of the present disclosure, the diluting agent may be extracted from the porous membrane by using an organic solvent, and then the porous membrane may be dried.

According to an embodiment of the present disclosure, the organic solvent is not particularly limited, as long as it is capable of extraction of the diluting agents. However, it is suitable to use methyl ethyl ketone, methylene chloride or hexane having high extraction efficiency and showing a high drying rate.

Herein, the solvent in the step of extracting the diluting agent may be the same as or different from the solvent used for the photocurable composition.

According to an embodiment of the present disclosure, when the solvent in the step of extracting the diluting agent is the same as the solvent of the photocurable composition, the photocurable composition described hereinafter may not be prepared separately, and a crosslinking agent and photoinitiator may be added to the solvent in the extraction step and then the resultant composition may be used as a photocurable composition.

According to an embodiment of the present disclosure, the extraction may be any conventional solvent extraction process, such as an immersion process, solvent spray process or ultrasonication process, and such processes may be used alone or in combination. After carrying out extraction, the content of residual diluting agents should be preferably 1 wt % or less. When the content of residual diluting agent is larger than 1 wt %, physical properties are degraded and permeability of the porous membrane is reduced. The content of residual diluting agent may be affected by extraction temperature and extraction time. To increase the solubility of diluting agents in the organic solvent, a higher extraction temperature is preferred. However, considering the safety problem caused by boiling of the organic solvent, the extraction temperature is preferably 40° C. or lower. When the extraction temperature equals to or lower than the solidifying point of the diluting agent, extraction efficiency may be decreased significantly. Thus, the extraction temperature should be higher than the solidifying point of the diluting agents.

In addition, the extraction time may be varied with the thickness of a porous membrane. In the case of a porous member having a thickness of 5-15 µm, the extraction time may be 2-4 minutes suitably.

The sheet from which the diluting agent is extracted is dipped in a photocurable composition containing a crosslinking agent, photoinitiator and a solvent and dried at room temperature so that the photocurable composition is coated on the surfaces of the fibrils of the elongated sheet.

Herein, the ingredients and composition of the photocurable composition are the same as described above.

Methods for coating the photocurable composition on the surfaces of the fibrils of the elongated sheet include dip coating, spray coating, or the like.

Then, the sheet coated with the photocurable composition is thermally fixed.

The thermal fixing is a process of fixing and heating the porous membrane coated with the photocurable composition so that the porous membrane to be shrunk may be fixed forcibly to remove residual stress.

The thermal fixing step may be carried out at −15° C. to −2° C., −12° C. to −3° C., or −10° C. to −5° C. compared to the melting point (Tm) of polyolefin. When the thermal fixing step is carried out at a temperature within the above-defined range, the residual stress of the porous membrane may be relieved while ensuring lithium ion conductivity advantageously.

According to an embodiment of the present disclosure, the thermal fixing temperature may be 123-134° C., or 127-132° C. When the thermal fixing temperature satisfies the above-defined range, polyolefin molecules may be rearranged to remove residual stress of the porous membrane, and the problem of pore blocking of the porous membrane caused by partial melting may be reduced.

According to an embodiment of the present disclosure, the thermal fixing time may be 10-120 seconds, 20-90 seconds, or 30-60 seconds. When the thermal fixing is carried out for the above-defined range of time, polyolefin molecules may be rearranged to remove residual stress of the porous membrane, and the problem of pore blocking of the porous membrane caused by partial melting may be reduced.

The thermal fixing step is carried out by increasing the speed of the sheet introduced to the thermal fixing step to 20-60% and then reducing the speed to 0-30% in the machine direction of the sheet, and by elongating the sheet to 20-180% of the width of the sheet introduced to the thermal fixing step and then relaxing the sheet to 0-50% in the transverse direction of the sheet. When carrying the speed increase, speed reduction, elongation and relaxing, it is possible to accomplish a desired level at once or in a 'stepwise manner'. Herein, speed increase, speed reduction, elongation or relaxing in a 'stepwise manner' means that a desired level is accomplished through multiple steps (or runs).

In general, unlike thermal fixing of the sheet only in the transverse direction, when the sheet is subjected to elongation and relaxing in the transverse direction and machine direction at the same time in the thermal fixing step, the porous membrane is further thinned in the thermal fixing step, and thus it is possible to increase a decreasing rate in thickness of the sheet in the thermal fixing step so that the initial extruded sheet may be provided with a large thickness. In this manner, it is possible to ensure uniformity and to prevent fracture during the elongation step, to facilitate thin filming of the separator, to remove residual stress sufficiently, and to improve heat shrinkage characteristics.

Before or after the thermal fixing step, the method further include a step of carrying out UV curing of one or both surfaces of the coated sheet.

Herein, UV curing may be carried out by using a UV curing device while controlling irradiation time and irradiation dose suitably depending on conditions, such as the content ratio of the photoinitiator/curing agent. For example, UV curing may be carried out in such a manner that the crosslinking agent may be crosslinked sufficiently to provide the separator with a melt-down temperature of 160° C. or more, or 170° C. or more, while the separator may not be damaged by the heat generated from the UV lamp.

In addition, the UV lamp used for the UV curing device may be selected suitably from a high-pressure mercury lamp, metal lamp, gallium lamp, or the like, depending on the initiator used for the composition.

According to an embodiment of the present disclosure, when the solvent used in the step of extracting the diluting agent is the same as the solvent of the photocurable composition, the photocurable composition may not be prepared separately, and a crosslinking agent and photoinitiator may be added to the solvent in the extraction step so that the resultant composition may be used as a photocurable composition. Thus, when carrying out UV curing before thermally fixing the sheet coated with the photocurable composition, there is an advantage in that coating layers containing a crosslinked polymer may be formed on the outside of the fibrils without any separate coating/drying steps.

In a variant, when UV curing is carried out after thermally fixing the sheet coated with the photocurable composition, coating layers are formed after the fibril structure of the separator is formed. Thus, it is possible to further improve the melt-down effect of the separator advantageously.

The separator according to the present disclosure may be interposed between a positive electrode and a negative electrode to provide an electrochemical device.

The electrochemical device includes any device which carries out electrochemical reaction, and particular examples thereof include all types of primary batteries, secondary batteries, fuel cells, solar cells or capacitors, such as super capacitor devices. Particularly, among the secondary batteries, lithium secondary batteries, including lithium metal secondary batteries, lithium ion secondary batteries, lithium polymer secondary batteries or lithium ion polymer batteries, are preferred.

The positive electrode and the negative electrode used in combination with the separator according to the present disclosure are not particularly limited, and may be obtained by allowing electrode active materials to be bound to an electrode current collector through a method generally known in the art. Among the electrode active materials, non-limiting examples of a positive electrode active material include conventional positive electrode active materials that may be used for the positive electrodes for conventional electrochemical devices. Particularly, lithium manganese oxides, lithium cobalt oxides, lithium nickel oxides, lithium iron oxides or lithium composite oxides containing a combination thereof are used preferably. Non-limiting examples of a negative electrode active material include conventional negative electrode active materials that may be used for the negative electrodes for conventional electrochemical devices. Particularly, lithium-intercalating materials, such as lithium metal or lithium alloys, carbon, petroleum coke, activated carbon, graphite or other carbonaceous materials, are used preferably. Non-limiting examples of a positive electrode current collector include foil made of aluminum, nickel or a combination thereof. Non-limiting examples of a negative electrode current collector include foil made of copper, gold, nickel, copper alloys or a combination thereof.

The electrolyte that may be used in the electrochemical device according to the present disclosure is a salt having a structure of $A^+B^-$, wherein $A^+$ includes an alkali metal cation such as $Li^+$, $Na^+$, $K^+$ or a combination thereof, and $B^-$ includes an anion such as $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$, $C(CF_2SO_2)_3^-$ or a combination thereof, the salt being dissolved or dissociated in an organic solvent including propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethyl methyl carbonate (EMC), gamma-butyrolactone (γ-butyrolactone) or a combination thereof. However, the present disclosure is not limited thereto.

Injection of the electrolyte may be carried out in an adequate step during the process for manufacturing a battery depending on the manufacturing process of a final product and properties required for a final product. In other words, injection of the electrolyte may be carried out before the assemblage of a battery or in the final step of the assemblage of a battery.

According to an embodiment of the present disclosure, processes for applying the separator to batteries include lamination and folding of the separator with electrodes as well as winding used generally.

The separator according to an embodiment of the present disclosure may be interposed between the positive electrode and the negative electrode. When an electrode assembly is formed by assembling a plurality of cells or electrodes, the separator may be interposed between the adjacent cells or electrodes. The electrode assembly may have various structures, such as a simple stack type, jelly-roll type, stacked-folded type, laminated-stacked type, or the like.

Examples will be described more fully hereinafter so that the present disclosure can be understood with ease. The following examples may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art.

Example 1

First, tris-(2-acryloxyethyl)isocyanurate as a crosslinking agent and 2,4,6-trimethylbenzoyl diphenylphosphine oxide as a photoinitiator were mixed in methylene chloride (MC) as a solvent to prepare a photocurable composition. Herein, 0.3 wt % of tris-(2-acryloxyethyl)isocyanurate and 0.3 wt % of 2,4,6-trimethylbenzoyl diphenylphosphine oxide were used based on 100 wt % of the photocurable composition, and the weight ratio of tris-(2-acryloxyethyl)isocyanurate to 2,4,6-trimethylbenzoyl diphenylphosphine oxide was 1:1.

A polyethylene porous substrate (Toray, porosity: 45%) having a thickness of 9 μm was dipped in the photocurable composition for 30 seconds, removed therefrom, and dried at room temperature (25° C.) for 1 minute.

Then, a high-pressure mercury lamp (Lichtzen high-pressure mercury lamp, LH-250/800-A) as a UV curing device was used to apply an energy of integrated light dose of 20 J/cm$^2$ only to the top surface of the polyethylene porous substrate coated with the photocurable composition to carry out curing. In this manner, a polyolefin separator, including coating layers surrounding the outside of the fibrils contained in the polyethylene porous substrate and including a crosslinked polymer prepared by UV curing, was obtained.

Herein, the content of the coating layers was 2.22 parts by weight based on 100 parts by weight of the polyolefin porous substrate.

Example 2

A polyolefin separator, including coating layers surrounding the outside of the fibrils contained in the polyethylene porous substrate and including a crosslinked polymer prepared by UV curing, was obtained in the same manner as Example 1, except that a high-pressure mercury lamp (Lichtzen high-pressure mercury lamp, LH-250/800-A) as a UV curing device was used to apply an energy of integrated light dose of 20 J/cm$^2$ to the top surface of the polyethylene porous substrate coated with the photocurable composition, and then applying an energy of integrated light dose of 20 J/cm$^2$ to the bottom surface of the polyethylene porous substrate to carry out curing of the fibril surfaces. Herein, the content of the coating layers was 2.22 parts by weight based on 100 parts by weight of the polyolefin porous substrate.

Comparative Example 1

A polyethylene porous substrate (Toray, porosity: 45%) having a thickness of 9 μm was used as a polyolefin separator without any coating treatment.

Comparative Example 2

A polyolefin separator was obtained in the same manner as Example 1, except that 5 wt % of tris-(2-acryloxyethyl)isocyanurate and 5 wt % of 2,4,6-trimethylbenzoyl diphenylphosphine oxide were used based on 100 wt % of the photocurable composition. Herein, the content of the coating layers was 22.2 parts by weight based on 100 parts by weight of the polyolefin porous substrate.

Comparative Example 3

To a monomer container of an initiated chemical vapor deposition (iCVD) reactor, hexavinyl disiloxane (HVDS) monomer was introduced and heated at 45° C. Tert-butyl peroxide (Aldrich 168521, 250 ml, 98%) was introduced to the initiator container as an initiator and maintained at room temperature.

A polyethylene porous substrate (Toray, porosity: 45%) having a thickness of 9 μm was fixed to and adhered to the bottom in the reactor, wherein the polyethylene porous substrate was maintained at a temperature of 25° C. The pressure in the chamber was maintained constantly at 250 mTorr. The filaments in the reactor was maintained at a temperature of 200° C.

The monomer and initiator were allowed to flow in the iCVD reactor at a ratio of 1:1 (weight ratio) and deposition was carried out for 30 minutes. In this manner, a polyolefin separator including the polyethylene porous substrate to which the crosslinked product of hexavinyl disiloxane was deposited was obtained.

Comparative Example 4

A polyolefin separator was obtained in the same manner as Comparative Example 3, except that deposition was carried out for 1 hour.

Characterization of Separators

Each of the separators according to Examples 1 and 2 and Comparative Examples 1-4 was evaluated in terms of air permeability, basis weight, melt-down temperature, a change in air permeability and a change in basis weight. The results are shown in the following Table 1.

(1) Evaluation of Air Permeability of Polyolefin Separator

Air permeability (Gurley) was determined according to the method defined by ASTM D726-94. As used herein, Gurley means resistance against air flow and is determined by Gurley densometer. The air permeability value means the time (second), i.e. air permeation time, required for 100 cc of air to pass through the section of 1 in² of each of the polyolefin separators obtained from Examples 1 and 2 and Comparative Examples 1-4 under a pressure of 12.2 in H₂O.

cause fracture is measured. The temperature is measured each in MD and TD, and the higher temperature is defined as the meltdown temperature of the corresponding sample.

Herein, a change in volume (change in length) as a function of temperature in each of the polyolefin separators obtained from Examples 1 and 2 and Comparative Examples 1 and 2 is shown in FIG. 1.

(4) Changes in Air Permeability and Basis Weight

A change in air permeability and a change in basis weight were calculated according to the following formulae.

In the following formulae, 'polyolefin porous substrate before coating' corresponds to Comparative Example 1.

Change in air permeability (%) =

[(Air permeability of polyolefin porous substrate having coating layers) − (Air permeability of polyolefin porous substrate before coating)] / (Air permeability of polyolefin porous substrate before coating) × 100

Change in basis weight (%) =

[(Basis weight of polyolefin porous substrate having coating layers) − (Basis weight of polyolefin porous substrate before coating)] / (Basis weight of polyolefin porous substrate before coating) × 100

TABLE 1

| Characteristics | Unit | Ex. 1 | Ex. 2 | Comp. Ex. 1 | Comp. Ex. 2 | Comp. Ex. 3 | Comp. Ex. 4 |
|---|---|---|---|---|---|---|---|
| Thickness | μm | 9.1 | 9.2 | 9.0 | 9.4 | 9.6 | 9.8 |
| Air permeability | sec/100 mL | 78 | 77 | 72 | 480 | 88 | 98 |
| Basis weight | g/cm² | 4.6 | 4.6 | 4.5 | 5.5 | 5.0 | 5.3 |
| Melt-down temperature | ° C. | 160 | 172 | 148 | 188 | 174 | 184 |
| Change in air permeability | % | 8.33 | 6.94 | 0 | 566.67 | 22.22 | 36.11 |
| Change in basis weight | % | 2.22 | 2.22 | 0 | 22.22 | 11.11 | 17.78 |

(2) Evaluation of Basis Weight of Polyolefin Separator

Basis weight (g/m²) was determined by preparing samples having a width and length of 1 m×1 m from the polyolefin separators according to Examples 1 and 2 and Comparative Examples 1-4 and measuring the weight of each sample.

(3) Evaluation of Melt-Down Temperature of Polyolefin Separator

The meltdown temperature is determined by taking a sample each in the machine direction (MD) and the transverse direction (TD) perpendicular to MD and analyzing the same through thermomechanical analysis (TMA). Particularly, a sample having a width of 4.5 mm and a length of 8 mm is introduced to a TMA instrument (TA instrument, Q400) and exposed to an increasing temperature condition (heating rate 5° C./min. from 30° C.), while applying a tension of 0.01 N thereto. As the temperature is increased, the sample undergoes a change in length, and the temperature at which point the sample length is increased rapidly to Referring to Table 1, it can be seen that each of the polyolefin separators according to Examples 1 and 2 has a significantly improved melt-down temperature and shows significantly improved stability, while not causing any significantly change in thickness, change in air permeability and change in basis weight, as compared to Comparative Example 1. Meanwhile, in the case of Comparative Example 2, it is obtained by using 5 wt % of the photoinitiator and 5 wt % of the crosslinking agent based on 100 wt % of the photocurable composition, and thus provides a high crosslinking degree to cause crosslinking shrinking. In addition, due to the coating with the photocurable composition having such a high concentration, the fibrils are thickened to cause a significant increase in air permeability and basis weight.

In addition, in the case of Comparative Examples 3 and 4, the polyethylene porous substrate is disposed in a chamber and the coating layer is deposited through iCVD. Thus, it is difficult for the crosslinkable compound forming the coating layer to infiltrate uniformly into the polyolefin porous substrate. As a result, the coating layer is concentrated on the surface of the separator, and thus air permeability is degraded more significantly, as compared to improvement of melt-down temperature.

What is claimed is:

1. A polyolefin separator, comprising:
a polyolefin porous substrate comprising a plurality of fibrils and pores formed by the fibrils draped across one another; and
coating layers surrounding an outer side of the fibrils contained in the polyolefin porous substrate and the coating layers comprising a crosslinked polymer,
wherein the coating layers surround the outside of the fibrils not only on the polyolefin separator surface but also inside the polyolefin separator, and are not separate coating layers differentiated from the porous substrate but are layers formed on the surface of each of the fibrils, and
wherein the polyolefin separator having the coating layers has a change in air permeability of 20% or less and a change in basis weight of 4% or less, as compared to the polyolefin porous substrate.

2. The polyolefin separator according to claim 1, wherein the crosslinked polymer is formed by UV curing of a crosslinking agent and a photoinitiator.

3. The polyolefin separator according to claim 1, wherein the polyolefin separator having the coating layer has a change in air permeability of 3%-20% and a change in basis weight of 0.5%-4%, as compared to the polyolefin porous substrate.

4. A method for manufacturing a polyolefin separator, comprising:
preparing a photocurable composition containing a crosslinking agent, a photoinitiator and a solvent;
dipping a polyolefin porous substrate comprising a plurality of fibrils in the photocurable composition and drying the polyolefin porous substrate at room temperature so that the photocurable composition is coated on surfaces of the fibrils of the polyolefin porous substrate; and
carrying out UV curing on one or both surfaces of the polyolefin porous substrate coated with the photocurable composition to form coating layers,
wherein the polyolefin separator having the coating layers has a change in air permeability of 20% or less and a change in basis weight of 4% or less, as compared to the polyolefin porous substrate.

5. A method for manufacturing the polyolefin separator according to claim 1, comprising:
introducing a polyolefin and a diluting agent to an extruder and mixing the polyolefin and the diluting agent therein, and carrying out extrusion to prepare an extruded polyolefin composition;
allowing the extruded polyolefin composition to pass through a die and cold casting roll to mold the extruded polyolefin composition in the form of a molded sheet;
orienting the molded sheet;
elongating the molded sheet to form an elongated sheet;
extracting the diluting agent from the elongated sheet to form an extracted elongated sheet;
dipping the extracted elongated sheet from which the diluting agent is extracted in a photocurable composition containing a crosslinking agent, a photocuring initiator and a solvent, and carrying out drying at room temperature so that the photocurable composition is coated on the surfaces of fibrils of the elongated sheet to form a coated elongated sheet; and
thermally fixing the coated elongated sheet coated,
the method further comprising carrying out UV curing of one or both surfaces of the coated elongated sheet, before or after the thermal fixing step, thereby forming coating layers,
wherein the polyolefin separator having the coating layers has a change in air permeability of 20% or less and a change in basis weight of 4% or less, as compared to the polyolefin porous substrate.

6. The method according to claim 4, wherein the crosslinking agent is a multi-functional (meth)acrylate monomer.

7. The method according to claim 6, wherein the crosslinking agent is a (meth)acrylate monomer having 2 to 5 carbon-carbon double bonded groups.

8. The method according to claim 4, wherein the crosslinking agent comprises triethylene glycol di(meth)acrylate, tetraethylene glycol di(meth)acrylate, polyethylene glycol di(meth)acrylate, tripropylene glycol di(meth)acrylate, tetrapropylene glycol di(meth)acrylate, polypropylene glycol di(meth)acrylate, polytetramethylene glycol di(meth)acrylate, dioxane glycol di(meth)acrylate, bis(meth)acryloyloxyethyl phosphate, trimethylolpropane tri(meth)acrylate, trimethylolpropane EO-added tri(meth)acrylate, trimethylolpropane PO-added tri(meth)acrylate, pentaerythritol tri(meth)acrylate, 2,2,2-tris(meth)acryloyloxy methylethylsuccinic acid, ethoxylated isocyanuric acid tri(meth)acrylate, tris-(2-(meth)acryloxyethyl) isocyanurate, glycerin EO-added tri(meth)acrylate, glycerin PO-added tri(meth)acrylate, tris (meth)acryloyloxyethyl phosphate, trimethylolpropane tri(meth)acrylate, trimethylolpropane EO-added tri(meth)acrylate, pentaerythritol tri(meth)acrylate, ditrimethylolpropane tetra(meth)acrylate, pentaerythritol tetra(meth)acrylate, pentaerythritol EO-added tetra(meth)acrylate, dipentaerythritol penta(meth)acrylate, or two or more thereof.

9. The method according to claim 4, wherein the photoinitiator comprises benzoin methyl ether, 2,4,6-trimethylbenzoyl diphenyl phosphine oxide (TPO), bis(2,4,6-trimethylbenzoyl)phenyl phosphine oxide, α,α-methoxy-α-hydroxyacetophenone, 2-benzoyl-2-(dimethylamino)-1-[4-(4-morpholinyl)phenyl]-1-butanone, 2,2-dimethoxy-2-phenylacetophenone, 2,2-dimethoxy-1,2-diphenylethane-1-on, 1-hydroxy-cyclohexyl-phenylketone, 2-benzyl-2-(dimethylamino)-1-[4-(4-morpholinyl)phenyl]-1-butanone, or two or more thereof.

10. The method according to claim 4, wherein the weight ratio of the crosslinking agent to the photoinitiator is from 1:1 to 10:1.

11. The method according to claim 4, wherein each of the content of the crosslinking agent and that of the photoinitiator is independently 0.1 wt %-20 wt %, based on 100 wt % of the photocurable composition.

12. A secondary battery comprising a positive electrode, a negative electrode and a polyolefin separator interposed between the positive electrode and the negative electrode, wherein the polyolefin separator is defined in claim 1.

13. A secondary battery comprising a positive electrode, a negative electrode and a polyolefin separator interposed between the positive electrode and the negative electrode, wherein the polyolefin separator is defined in claim 2.

14. A secondary battery comprising a positive electrode, a negative electrode and a polyolefin separator interposed between the positive electrode and the negative electrode, wherein the polyolefin separator is defined in claim 3.

15. The method according to claim 5, wherein the crosslinking agent is a multi-functional (meth)acrylate monomer.

16. The method according to claim 5, wherein the crosslinking agent comprises triethylene glycol di(meth)acrylate, tetraethylene glycol di(meth)acrylate, polyethylene glycol di(meth)acrylate, tripropylene glycol di(meth)acrylate, tetrapropylene glycol di(meth)acrylate, polypropylene glycol di(meth)acrylate, polytetramethylene glycol di(meth)acrylate, dioxane glycol di(meth)acrylate, bis(meth)acryloyloxyethyl phosphate, trimethylolpropane tri(meth)acrylate, trimethylolpropane EO-added tri(meth)acrylate, trimethylolpropane PO-added tri(meth)acrylate, pentaerythritol tri(meth)acrylate, 2,2,2-tris(meth)acryloyloxy methylethylsuccinic acid, ethoxylated isocyanuric acid tri(meth)acrylate, tris-(2-(meth)acryloxyethyl) isocyanurate, glycerin EO-added tri(meth)acrylate, glycerin PO-added tri(meth)acrylate, tris (meth)acryloyloxyethyl phosphate, trimethylolpropane tri(meth)acrylate, trimethylolpropane EO-added tri(meth)acrylate, pentaerythritol tri(meth)acrylate, ditrimethylolpropane tetra(meth)acrylate, pentaerythritol tetra(meth)acrylate, pentaerythritol EO-added tetra(meth)acrylate, dipentaerythritol penta(meth)acrylate, or two or more thereof.

17. The method according to claim 5, wherein the photoinitiator comprises benzoin methyl ether, 2,4,6-trimethylbenzoyl diphenyl phosphine oxide (TPO), bis(2,4,6-trimethylbenzoyl)phenyl phosphine oxide, $\alpha,\alpha$-methoxy-$\alpha$-hydroxyacetophenone, 2-benzoyl-2-(dimethylamino)-1-[4-(4-morphinyl)phenyl]-1-butanone, 2,2-dimethoxy-2-phenylacetophenone, 2,2-dimethoxy-1,2-diphenylethane-1-on, 1-hydroxy-cyclohexyl-phenylketone, 2-benzyl-2-(dimethylamino)-1-[4-(4-morpholinyl)phenyl]-1-butanon, or two or more thereof.

18. The method according to claim 5, wherein the weight ratio of the crosslinking agent to the photoinitiator is from 1:1 to 10:1.

19. The method according to claim 5, wherein each of the content of the crosslinking agent and that of the photoinitiator is independently 0.1 wt %-20 wt %, based on 100 wt % of the photocurable composition.

* * * * *